US012623607B2

(12) United States Patent
Benigni et al.

(10) Patent No.: US 12,623,607 B2
(45) Date of Patent: May 12, 2026

(54) CARGO MANAGEMENT SYSTEM FOR A VEHICLE

(71) Applicant: GM Global Technology Operations LLC, Detroit, MI (US)

(72) Inventors: James L. Benigni, Metamora, MI (US); Patrick Minjeur, Sterling Heights, MI (US); Michael Apone, Macomb, MI (US); Owen Rauch, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 541 days.

(21) Appl. No.: 18/184,321

(22) Filed: Mar. 15, 2023

(65) Prior Publication Data

US 2024/0308430 A1 Sep. 19, 2024

(51) Int. Cl.
B60R 5/04 (2006.01)

(52) U.S. Cl.
CPC ...................................... B60R 5/04 (2013.01)

(58) Field of Classification Search
CPC .. B60R 5/00; B60R 5/04; B60R 5/041; B60R 7/043; B60R 7/02; B60R 2011/0036; B60R 2011/0029; B60R 2011/0084; B60R 11/06; B62D 33/046
USPC ............. 296/37.5, 24.33, 37.8, 37.14, 37.15, 296/37.16; 224/542, 498, 281, 42.34
See application file for complete search history.

(56) References Cited

U.S. PATENT DOCUMENTS 6,308,873 B1 * 10/2001 Baldas ...................... B60R 7/02
217/15

2001/0020631 A1 * 9/2001 Spykerman ............... B60R 7/02
224/539
2005/0001442 A1 1/2005 Cuma
2016/0318451 A1 * 11/2016 Li ............................. B60R 7/02
2018/0022280 A1 * 1/2018 Ferreira Yanez ......... B60R 5/04
224/411
2018/0371795 A1 * 12/2018 Nakasone ............... E05C 9/041
2021/0300252 A1 * 9/2021 Fusco ..................... B60R 5/041

(Continued)

FOREIGN PATENT DOCUMENTS

DE 19619126 A1 * 11/1997 ............... B60R 5/04
DE 10124375 C1 11/2002

(Continued)

OTHER PUBLICATIONS

Tyler et al. (DE 102008010923 A1), EPO translation (Year: 2009).*
German Office Action for German Application No. 102023126873. 2; dated May 28, 2025; 6 pages.

*Primary Examiner* — Amy R Weisberg
*Assistant Examiner* — Wenwei Zhuo
(74) *Attorney, Agent, or Firm* — CANTOR COLBURN LLP

(57) ABSTRACT

A cargo management system for a vehicle includes a base member slidably supported in a cargo zone of a vehicle. A collapsible cargo box is mounted to the base member. The collapsible cargo box includes a bottom wall, and a plurality of side walls that define a storage zone. A deployment mechanism is operatively connected to the base member. The deployment mechanism selectively biases the base member outwardly from the cargo zone. An actuator is operatively connected to the deployment mechanism. The actuator selectively triggers the deployment mechanism to shift the base member outwardly of the cargo zone.

20 Claims, 4 Drawing Sheets

(56)         References Cited

U.S. PATENT DOCUMENTS

| | | | |
|---|---|---|---|
| 2024/0002174 A1 * | 1/2024 | Martin .................... | B66F 9/065 |
| 2025/0162506 A1 * | 5/2025 | Schaenzer .............. | B60R 5/041 |

FOREIGN PATENT DOCUMENTS

| | | | | |
|---|---|---|---|---|
| DE | 10317539 | A1 | 11/2004 | |
| DE | 10325034 | A1 | 1/2005 | |
| DE | 10327012 | B4 | 7/2007 | |
| DE | 10018148 | B4 | 3/2008 | |
| DE | 10327014 | B4 | 8/2008 | |
| DE | 102005040854 | B4 | 11/2008 | |
| DE | 102008010923 | A1 * | 8/2009 | .............. B60J 5/103 |
| DE | 10203539 | B4 | 1/2010 | |
| DE | 102010010199 | B4 | 9/2011 | |
| EP | 1955894 | A2 | 8/2008 | |

* cited by examiner

CARGO MANAGEMENT SYSTEM FOR A VEHICLE

INTRODUCTION

The subject disclosure relates to the art of vehicle systems and, more particularly, to a cargo management system for a vehicle.

Most vehicles include cargo areas in which users may store, either on a temporary basis, or longer term, various items. Passenger vehicles include trunks that users rely upon to transport groceries, store spare tires, and the like. Pickup trucks include cargo beds that are used to transport items of various sizes. Sport utility vehicles (SUV's) include a cargo area that may be expanded by adjusting seat configurations. Often times smaller items may bounce around a cargo area, bags may topple over spilling contents, and other items may simply slide to a point that is difficult for a user to reach.

Many owners of passenger vehicles, pickup trucks, and SUV's use nets that stretch across a portion of the trunk to retain items. Often times the net is not robust enough to retain larger items. Nets tear and require storage. Plastic crates and cardboard boxes are also used to retain items in the trunk. Adding boxes of any sort imposes limits to cargo holding areas and, by extension, limits the size of items that may be carried. Boxes also may slide around making retrieval of items difficult. Accordingly, it is desirable to provide a system for storing items in a cargo area of a vehicle that not only prevents items from moving around but also promotes easy retrieval and is readily storable.

SUMMARY

A cargo management system for a vehicle, in accordance with a non-limiting example, includes a base member slidably supported in a cargo zone of a vehicle. A collapsible cargo box is mounted to the base member. The collapsible cargo box includes a bottom wall, and a plurality of side walls that define a storage zone. A deployment mechanism is operatively connected to the base member. The deployment mechanism selectively biases the base member outwardly from the cargo zone. An actuator is operatively connected to the deployment mechanism. The actuator selectively triggers the deployment mechanism to shift the base member outwardly of the cargo zone.

In addition to one or more of the features described herein the plurality of side walls of the collapsible cargo box include a rearwardly facing side wall, an inwardly facing side wall arranged opposite the rearwardly facing side wall, a first lateral side wall, and a second lateral side wall opposite the first lateral side wall, the rearwardly facing side wall being selectively pivotable relative to the bottom wall.

In addition to one or more of the features described herein the rearwardly facing side wall includes a latch member selectively connected to each of the first lateral side wall and the second lateral side wall.

In addition to one or more of the features described herein a release mechanism is connected to the latch member, the release mechanism selectively disconnecting the latch member from each of the first lateral side wall and the second lateral side wall.

In addition to one or more of the features described herein the release mechanism is mounted to the rearwardly facing side wall.

In addition to one or more of the features described herein each of the first lateral side wall and the second lateral side wall include fold pleats that may be selectively folded into the storage zone.

In addition to one or more of the features described herein each of the rearwardly facing side wall and the inwardly facing side wall are foldable relative to the bottom wall.

In addition to one or more of the features described herein a support element including a support pin is connected to a side edge of the base member, the support pin being slidable in a guide track arranged on the side edge.

In addition to one or more of the features described herein the deployment mechanism comprises an electric motor.

In addition to one or more of the features described herein a control module is operatively connected to the electric motor, the control module activating the electric motor to shift the base member outwardly of the cargo zone.

A vehicle, in accordance with a non-limiting example, includes a body defining a passenger compartment including a passenger area and a cargo zone and a cargo management system arranged in the cargo zone. The cargo management system includes a base member slidably supported in the cargo zone. A collapsible cargo box is mounted to the base member. The collapsible cargo box includes a bottom wall, and a plurality of side walls that define a storage zone. A deployment mechanism is operatively connected to the base member. The deployment mechanism selectively biases the base member outwardly from the cargo zone. An actuator is operatively connected to the deployment mechanism. The actuator selectively triggers the deployment mechanism to shift the base member outwardly of the cargo zone.

In addition to one or more of the features described herein the plurality of side walls of the collapsible cargo box include a rearwardly facing side wall, an inwardly facing side wall arranged opposite the rearwardly facing side wall, a first lateral side wall, and a second lateral side wall opposite the first lateral side wall, the rearwardly facing side wall being selectively pivotable relative to the bottom wall.

In addition to one or more of the features described herein the rearwardly facing side wall includes a latch member selectively connected to each of the first lateral side wall and the second lateral side wall.

In addition to one or more of the features described herein a release mechanism is connected to the latch member, the release mechanism selectively disconnecting the latch member from each of the first lateral side wall and the second lateral side wall.

In addition to one or more of the features described herein the release mechanism is mounted to the rearwardly facing side wall.

In addition to one or more of the features described herein each of the first lateral side wall and the second lateral side wall include fold pleats that may be selectively folded into the storage zone.

In addition to one or more of the features described herein each of the rearwardly facing side wall and the inwardly facing side wall are foldable relative to the bottom wall.

In addition to one or more of the features described herein a support element including a support pin is connected to a side edge of the base member, the support pin being slidable in a guide track arranged on the side edge.

In addition to one or more of the features described herein the deployment mechanism comprises an electric motor.

In addition to one or more of the features described herein a control module operatively connected to the electric motor, the control module activating the electric motor to shift the base member outwardly of the cargo zone.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
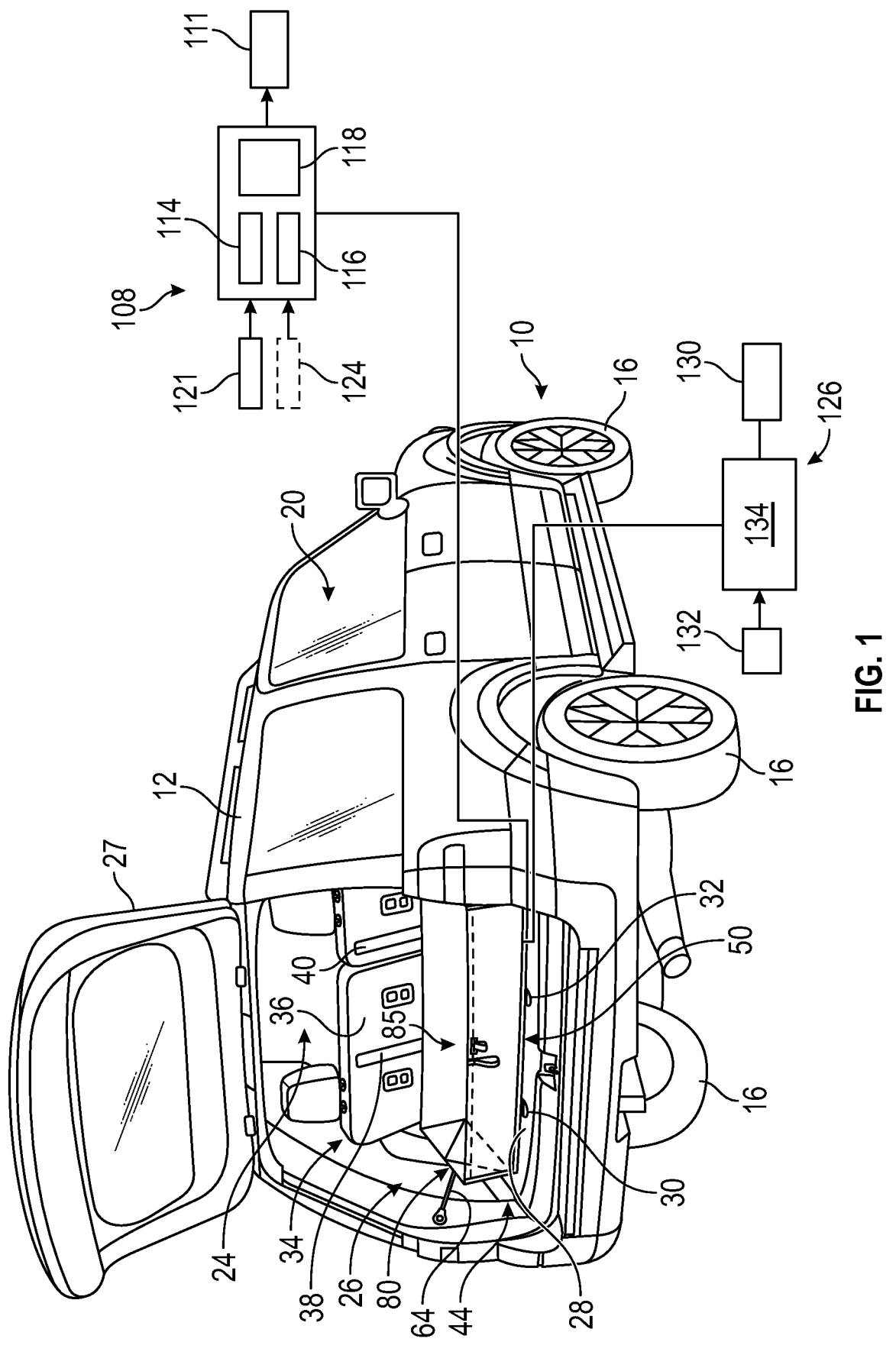
FIG. 1 is a right rear perspective view of a vehicle including a cargo management system including a collapsible cargo box, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that includes a non-transitory computer-readable medium having instructions stored thereon, that when executed by one or more modules may perform various functions including executing one or more software or firmware programs, a combinational logic circuit, and/or other suitable components that provide the described functionality.

Figure 2:
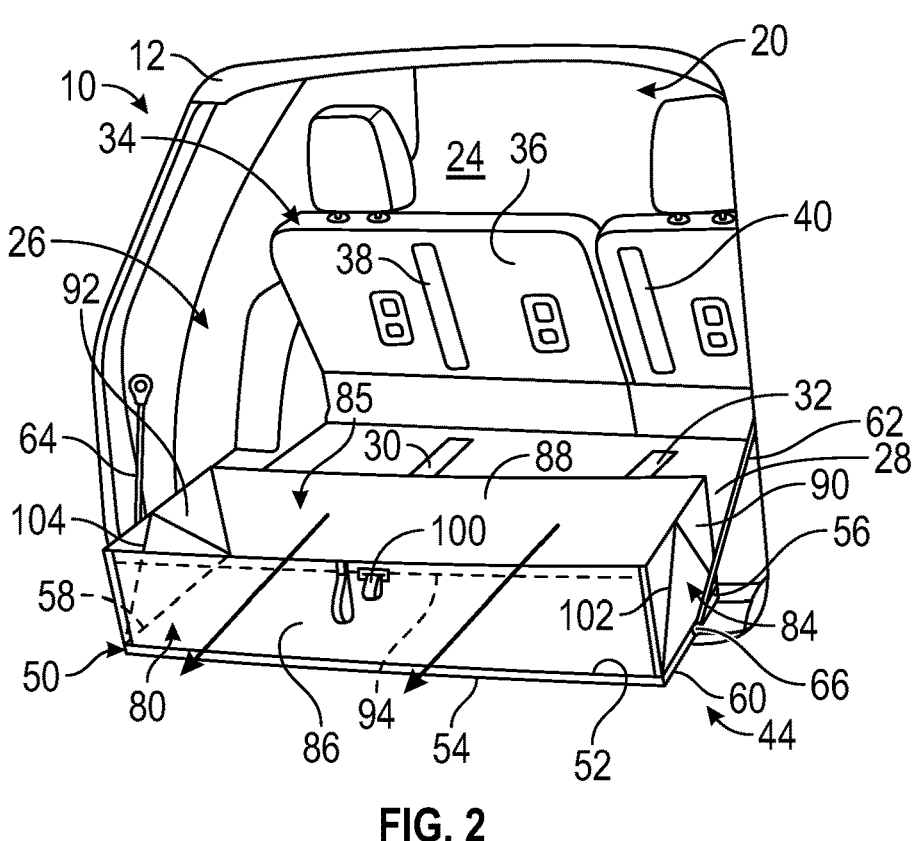
FIG. 2 is a right rear elevational view of the vehicle of FIG. 1 showing the collapsible cargo box extending outward on a sliding base member, in accordance with a non-limiting example.

A vehicle, in accordance with a non-limiting example, is indicated generally at 10 in FIGS. 1 and 2. Vehicle 10 is shown in the form of a sport utility vehicle (SUV). It should however be understood that vehicle 10 is not limited to the particular body type shown and could take on various other forms including passenger vehicles, pickup trucks, vans, and the like. Vehicle 10 includes a body 12 supported on a plurality of wheels, three of which are indicated at 16. Body 12 defines a passenger compartment 20 including a passenger area 24 and a cargo zone 26 that is accessed via a hatch 27.

Cargo zone 26 includes a floor 28 that supports a first slider 30 and a second slider 32. First slider 30 and second slider 32 extending between a rear opening (not separately labeled) of cargo zone 26 and a rear seat 34 arranged in passenger area 24. Rear seat 34 includes a seat back 36 that supports a third slider 38 and a fourth slider 40. As will be detailed more fully herein, seat back 36 may fold forward (FIG. 5) to increase an overall area of cargo zone 26. That is, when seat back 36 is folded forward, cargo zone 26 extends into passenger area 24.

In a non-limiting example, a cargo management system 44 is arranged in cargo zone 26. Cargo management system 44 includes a base member 50 that is, as will be detailed more fully herein, selectively shiftably supported on floor 28 of cargo zone 26. Base member 50 includes an upper surface 52, a lower surface 54, a first side edge 56, and a second side edge 58. First side edge 56 includes a guide track 60. Second side edge 58 also includes a guide track (not shown). A first support element 62 is connected to first side edge 56 and a second support element 64 is connected to second side edge 58. A support pin 66 connects first support element 62 to first side edge 56. Support pin 66 may shift within guide track 60 as base member 50 translates into and out from cargo zone 26.

Figure 3:
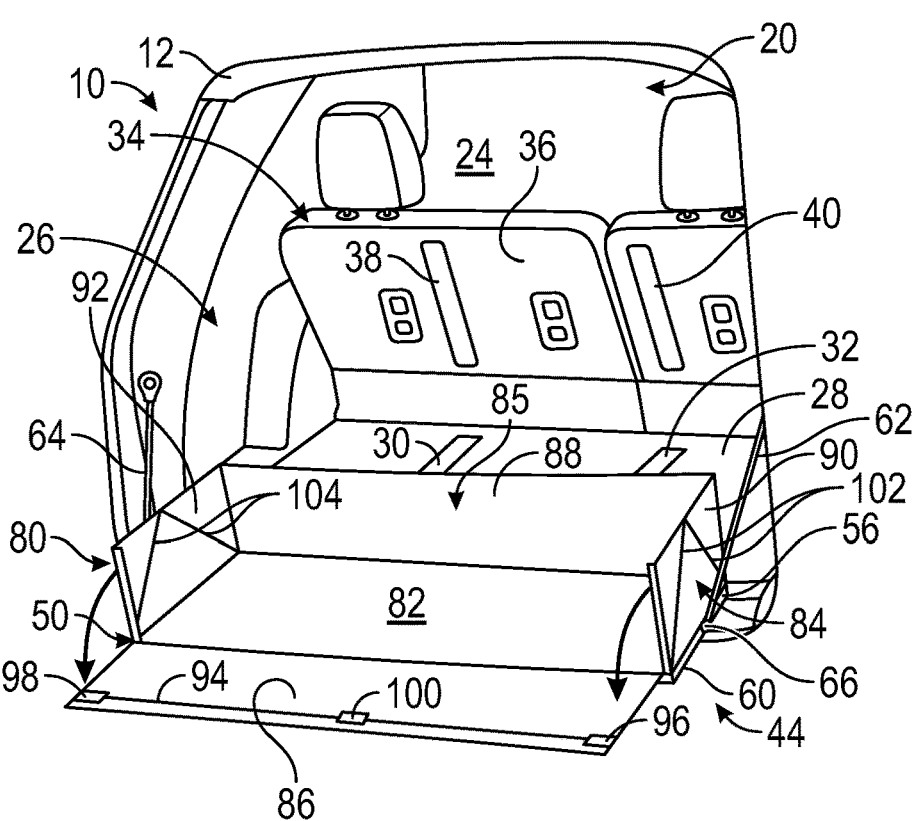
FIG. 3 is a right rear elevational view of the vehicle of FIG. 2 depicting a face of the cargo box folded open, in accordance with a non-limiting example.

In a non-limiting example, a collapsible cargo box 80 is mounted to base member 50. The term "mounted" should be understood to describe that collapsible cargo box 80 may simply rest on base member 50 or may be secured to base member 50 through fasteners. Collapsible cargo box 80 includes a bottom wall 82 (FIG. 3) and a plurality of side walls 84 that define a storage zone 85. Plurality of side walls 84 include a rearwardly facing side wall 86, a forwardly or inwardly facing side wall 88, a first lateral side wall 90, and a second lateral side wall 92. Rearwardly facing side wall 86 supports a latch member 94 having a first end 96 that engages first lateral side wall 90 and a second end 98 that engages second lateral side wall 92. A release mechanism 100 is connected to latch member 94 and is also supported on rearwardly facing side wall 86. Release mechanism 100 selectively disengages first end 96 and second end 98 of latch member 94 from first lateral side wall 90 and second lateral side wall 92 respectively. In this manner, rearwardly facing side wall 86 may fold relative to bottom wall 82 as shown in FIG. 3 to provide enhanced access to storage zone 85.

Figure 4:
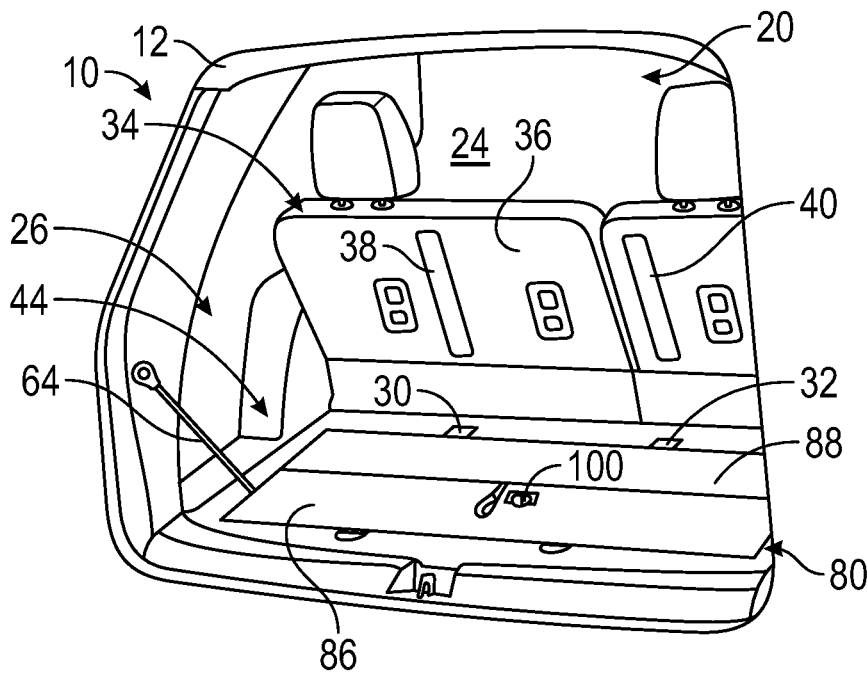
FIG. 4 is a right rear elevational view of the collapsible cargo box folded into a stowed configuration, in accordance with a non-limiting example.

In a non-limiting example, first lateral side wall 90 includes a first set of fold pleats 102 and second lateral side wall 92 includes a second set of fold pleats 104. First set of fold pleats 102 allows first lateral side wall 90 to be folded inwardly. Likewise, second set of fold pleats 104 allow second lateral side wall 92 to fold inwardly. As first lateral side wall 90 and second lateral side wall 92 fold inwardly, rearwardly facing side wall 86 and inwardly facing side wall 88 may also fold inwardly such that collapsible cargo box 80 may be folded flat as shown in FIG. 4.

Figure 5:
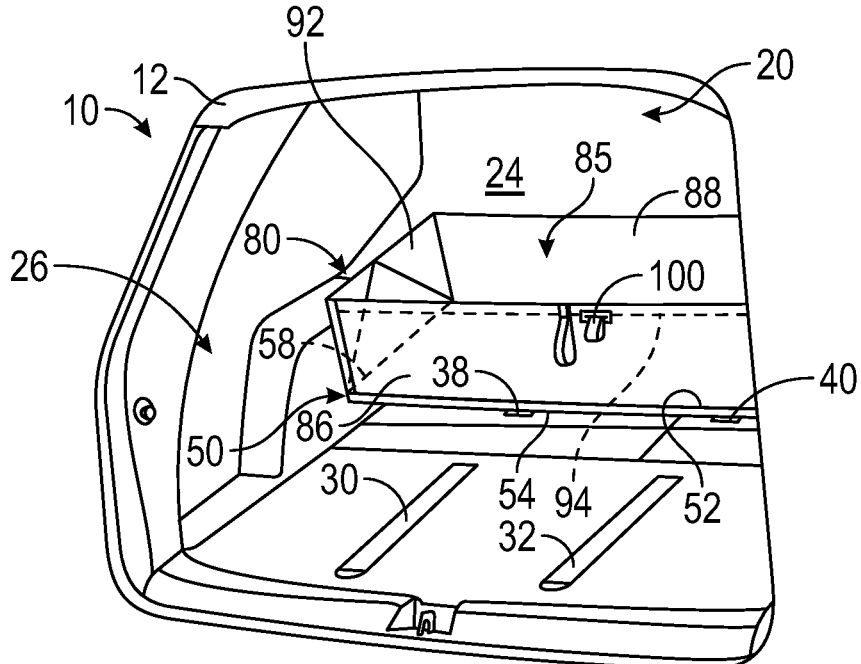
FIG. 5 depicts the collapsible cargo box shifted onto folded seatbacks of the vehicle of FIG. 1, in accordance with a non-limiting example.

In a non-limiting example shown in FIG. 1, a first deployment mechanism 108 is operatively connected to base member 50. First deployment mechanism 108 includes an electric motor 111 which, when activated, shifts base member 50 out from and/or into cargo zone 26. In addition to electric motor 111, deployment mechanism 108 includes a first sensor 114 that is connected to a rear hatch (not shown) of vehicle 10 and a second sensor 116 connected to base member 50. A control module 118 is connected to electric motor 111, first sensor 114 and second sensor 116. In addition to shifting out from cargo zone 26, seat back 36 of rear seat 34 may fold forward and collapsible cargo box 80 may be shifted into passenger area 24 on third slider 38 and fourth slider 40 as shown in FIG. 5 to provide additional storage space in cargo zone 26.

An actuator 121 is connected to deployment mechanism 108 and is activated to initiate operation of electric motor 111. Another actuator, that may take the form of a wireless actuator 124 such as may be found on a key fob may also be connected to deployment mechanism 108. A second deployment mechanism 126 may also be connected to base member 50. Second deployment system 126 is manually operated and includes a spring 130 coupled to a spring release 132. In the event electric motor 111 does not function, spring release 132 may be activated to activate a release mechanism 134 to release spring 130 allowing base member 50 to extend outwardly from cargo zone 26. At this point, it should be understood that vehicle 10 may include first deployment mechanism 108 or second deployment mechanism 126 or both first deployment mechanism 108 and second deployment mechanism 126 depending on vehicle preferences.

Figure 6:
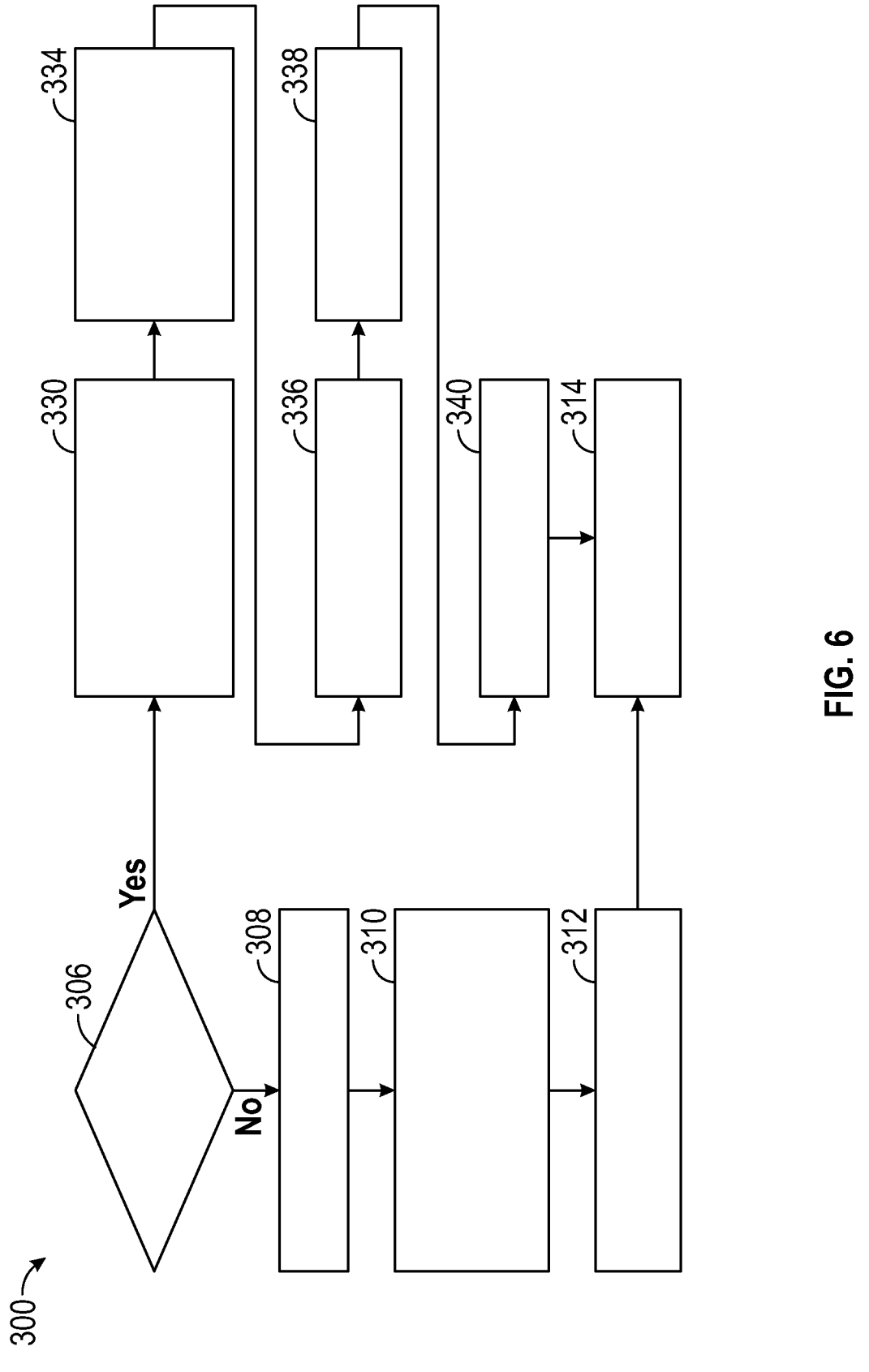
FIG. 6 is a flow chart depicting a method of deploying the base member, in accordance with a non-limiting example.

Reference will now follow to FIG. 6 in describing a method 300 for shifting base member 50 into and out from cargo zone 26. In accordance with a non-limiting example, control module 118 includes a non-transitory computer-readable medium having instructions stored thereon, that when executed by one or more processors executes the steps defining method 300. block 306, a determination is made in control module 118 whether first deployment mechanism 108 is present and enabled. If not present or not enabled, manual activation of second deployment mechanism 126 may be triggered in block 308 and spring release 132 activated in block 310 to release spring 130 causing base member 50 to shift out from cargo zone 26. Base member 50 may be manually inserted back into cargo zone 26 in block 312 and a determination is made in block 314 that base member 50 is in a driving position.

If in block 306 control module 118 determines that first deployment mechanism 108 is present and enabled, actuator 121 is activated in block 330 signaling control module 118 to initiate operation of electric motor 111. Electric motor 112 shifts base member 50 out from cargo zone 26 in block 334. In block 336, actuator 121 may again be activated signaling control module 118 to operate electric motor 111 to slide base member 50 back into cargo zone 26 and in block 338 a user may active a hatch close switch which may be on a key fob or provided as dedicated button on vehicle 10. In block 340 the hatch closes and in block 314 base member 50 is back in driving position.

Control module 118 may rely on first sensor 114 and/or second sensor 116 to control operation of electric motor 111. For example, control module 118 will prevent motor operation and deployment of base member 50 outwardly if rear hatch is closed. Similarly, control module 118 will prevent motor operation and deployment of base member 50 if motor torque increases indicating that base member 50 may be blocked.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for a vehicle comprising:
a cargo zone of the vehicle defined at least in part by a floor and a rear seatback;
first and second sliders disposed on the floor;
third and fourth sliders disposed on the rear seatback; and
a cargo management system comprising:
a base member configured to be slidably engaged with the first and second sliders in a first configuration and slidably engaged with the third and fourth sliders in a second configuration, the seatback being folded in at least the second configuration;
a collapsible cargo box mounted to the base member, the collapsible cargo box including a bottom wall, and a plurality of side walls that define a storage zone;
a deployment mechanism comprising an electric motor or a spring operatively connected to the base member, the deployment mechanism selectively biasing the base member outwardly from the cargo zone when the base member is in the first configuration;
an actuator operatively connected to the deployment mechanism, the actuator selectively triggering the deployment mechanism to shift the base member outwardly of the cargo zone; and
a support element including a support pin connected to a side edge of the base member,
wherein the support pin is slidable in a guide track arranged on the side edge as the base member translates into and out from the cargo zone.

2. The system according to claim 1, wherein the plurality of side walls of the collapsible cargo box include a rearwardly facing side wall, an inwardly facing side wall arranged opposite the rearwardly facing side wall, a first lateral side wall, and a second lateral side wall opposite the first lateral side wall, the rearwardly facing side wall being selectively pivotable relative to the bottom wall.

3. The system according to claim 2, wherein the rearwardly facing side wall includes a latch member selectively connected to each of the first lateral side wall and the second lateral side wall.

4. The system according to claim 2, wherein each of the first lateral side wall and the second lateral side wall include fold pleats that may be selectively folded into the storage zone.

5. The system according to claim 4, wherein each of the rearwardly facing side wall and the inwardly facing side wall are foldable relative to the bottom wall.

6. The system according to claim 1, wherein the deployment mechanism comprises the electric motor.

7. The system according to claim 6, further comprising a control module operatively connected to the electric motor, the control module activating the electric motor to shift the base member outwardly of the cargo zone.

8. A vehicle comprising:

a body defining a passenger compartment including a passenger area and a cargo zone defined at least in part by a floor and a rear seatback;

first and second sliders disposed on the floor;

third and fourth sliders disposed on the rear seatback; and a system arranged in the cargo zone, the system comprising:

a base member configured to be slidably engaged with the first and second sliders in a first configuration and slidably engaged with the third and fourth sliders in a second configuration, the seatback being folded in at least the second configuration;

a collapsible cargo box mounted to the base member, the collapsible cargo box including a bottom wall, and a plurality of side walls that define a storage zone;

a deployment mechanism comprising an electric motor or a spring operatively connected to the base member, the deployment mechanism selectively biasing the base member outwardly from the cargo zone when the base member is in the first configuration;

an actuator operatively connected to the deployment mechanism, the actuator selectively triggering the deployment mechanism to shift the base member outwardly of the cargo zone; and a support element including a support pin connected to a side edge of the base member, wherein the support pin is slidable in a guide track arranged on the side edge as the base member translates into and out from the cargo zone.

9. The vehicle according to claim 8, wherein the plurality of side walls of the collapsible cargo box include a rearwardly facing side wall, an inwardly facing side wall arranged opposite the rearwardly facing side wall, a first lateral side wall, and a second lateral side wall opposite the first lateral side wall, the rearwardly facing side wall being selectively pivotable relative to the bottom wall.

10. The vehicle according to claim 9, wherein the rearwardly facing side wall includes a latch member selectively connected to each of the first lateral side wall and the second lateral side wall.

11. The vehicle according to claim 9, wherein each of the first lateral side wall and the second lateral side wall include fold pleats that may be selectively folded into the storage zone.

12. The vehicle according to claim 11, wherein each of the rearwardly facing side wall and the inwardly facing side wall are foldable relative to the bottom wall.

13. The vehicle according to claim 8, wherein the deployment mechanism comprises the electric motor.

14. The vehicle according to claim 13, further comprising a control module operatively connected to the electric motor, the control module activating the electric motor to shift the base member outwardly of the cargo zone.

15. The cargo measurement system according to claim 1, wherein the first and second sliders are spaced from lateral edges of the floor.

16. The cargo measurement system according to claim 1, wherein the third and fourth sliders are spaced from lateral edges of the rear seatback.

17. The cargo measurement system according to claim 1, wherein the collapsible cargo box is configured to overlap the first and second sliders when in the cargo zone.

18. The vehicle according to claim 8, wherein the first and second sliders are spaced from lateral edges of the floor.

19. The vehicle according to claim 8, wherein the third and fourth sliders are spaced from lateral edges of the rear seatback.

20. The vehicle according to claim 8, wherein the collapsible cargo box is configured to overlap the first and second sliders when in the cargo zone.

* * * * *